United States Patent
Münch et al.

(10) Patent No.: US 7,002,102 B2
(45) Date of Patent: Feb. 21, 2006

(54) TOOLHOLDER FOR COUPLING A TOOL TO A HANDLING DEVICE

(75) Inventors: Heinz-Martin Münch, Grünberg (DE); Jörg Schwarz, Buseck (DE)

(73) Assignee: Alexander Binzel Schweisstechnik GmbH & Co. KG, Buseck (DE)

(*) Notice: Subject to any disclaimer, the term of this patent is extended or adjusted under 35 U.S.C. 154(b) by 208 days.

(21) Appl. No.: 10/480,640

(22) PCT Filed: Jun. 11, 2002

(86) PCT No.: PCT/EP02/06359

§ 371 (c)(1),
(2), (4) Date: Dec. 24, 2003

(87) PCT Pub. No.: WO03/004225

PCT Pub. Date: Jan. 16, 2003

(65) Prior Publication Data

US 2004/0175227 A1 Sep. 9, 2004

(30) Foreign Application Priority Data

Jul. 3, 2001 (DE) ................ 101 32 117

(51) Int. Cl.
*B23K 9/12* (2006.01)

(52) U.S. Cl. ............... 219/124.34; 414/730; 901/42; 901/49

(58) Field of Classification Search ......... 219/124.34, 219/125.1; 414/730; 901/29, 42, 49
See application file for complete search history.

(56) References Cited

U.S. PATENT DOCUMENTS

| | | | | |
|---|---|---|---|---|
| 4,514,616 A | * | 4/1985 | Warner | 901/42 |
| 4,639,184 A | | 1/1987 | Knasel et al. | 414/730 |
| 4,655,674 A | * | 4/1987 | Kohler et al. | 901/49 |
| 4,954,005 A | | 9/1990 | Knasel et al. | 403/57 |
| 5,626,216 A | * | 5/1997 | Sperling et al. | 901/49 |
| 6,346,751 B1 | * | 2/2002 | Delfino et al. | 901/49 |

FOREIGN PATENT DOCUMENTS

| | | |
|---|---|---|
| DE | 3333979 | 4/1985 |
| DE | 3445849 | 9/1986 |
| EP | 249774 | 12/1987 |
| WO | WO 95/07802 | 3/1995 |

* cited by examiner

*Primary Examiner*—Clifford C. Shaw
(74) *Attorney, Agent, or Firm*—Charles P. Boukus, Jr.

(57) ABSTRACT

The invention relates to a toolholder (10) for coupling a welding torch to an industrial robot (14), comprising a first fixing device (16) for fixing the welding torch (12) to the toolholder (10) and comprising a second fixing device (18) for fixing the toolholder (10) to the industrial robot (14). The first and second fixing devices (16, 18) can be displaced or repositioned with regard to one another counter to the action of spring elements (22, 24). The toolholder also comprises a protective circuit (26) for deactivating the welding torch (12) when predetermined displacements or repositionings are exceeded. A component (28) connected to the first fixing device (16) can be repositioned in the Z-direction (30) (toolholder longitudinal axis) and can be displaced in the X-direction and/or Y-direction (32, 34) with regard to the second fixing device (18). When displacing in the X-direction and/or Y-direction (32, 34), at least one spring element (22) having a first spring hardness is loaded, and at least one second spring element (24) having a second, different spring hardness is loaded during a repositioning in the Z-direction (30). The invention provides that the first spring element(s) (22) and the at least one second spring element (24) are arranged in series or are arranged in succession in two stages.

16 Claims, 3 Drawing Sheets

B-B

C-C

TOOLHOLDER FOR COUPLING A TOOL TO A HANDLING DEVICE

Figure 1:
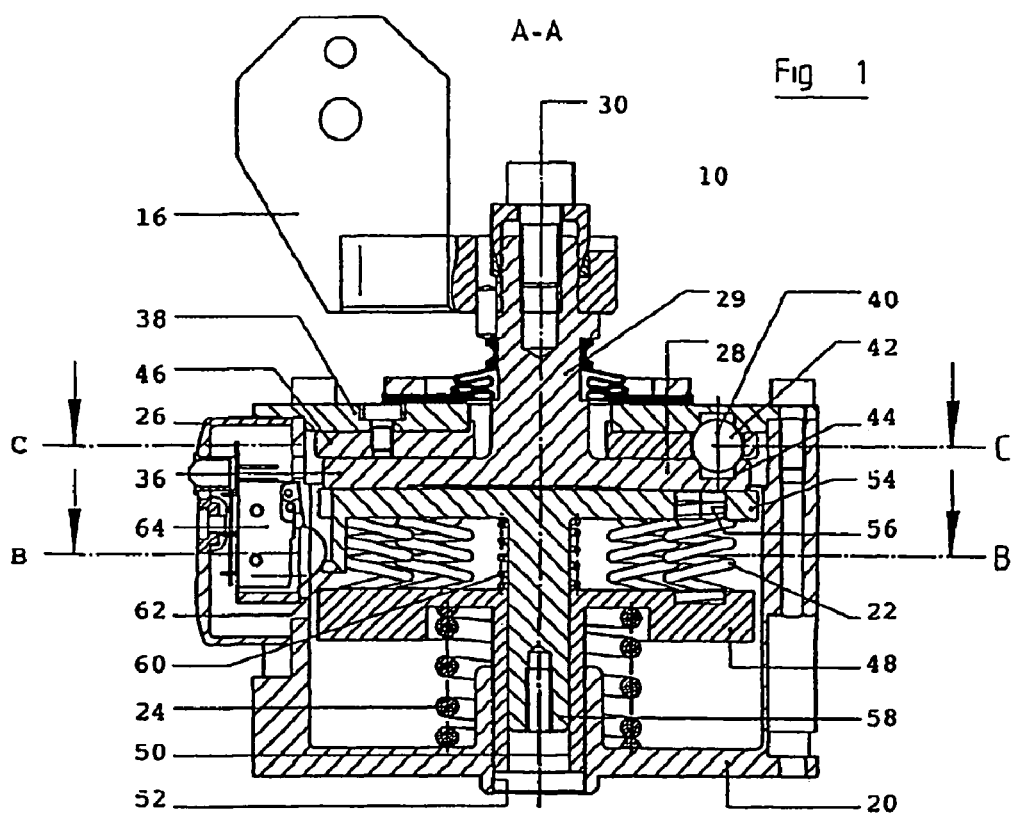

A toolholder for coupling a tool, in particular a welding torch or cutting torch, to a handling device, in particular an industrial robot, having a first mount for fixing the tool to the toolholder and having a second mount, such as a housing, for fixing the toolholder to the handling device, wherein the first and second mounts can be displaced or repositioned relative to one another counter to a spring prestressing of spring elements, and having a protective circuit for deactivating the handling device and/or the tool if predetermined displacements or repositionings are exceeded, wherein a component connected to the first mount can be repositioned or driven in the Z-direction (the longitudinal axis of the toolholder) and can be displaced in the X- and/or Y-direction, for instance being pivotable or tiltable, relative to the second mount, and upon displacement in the X- and/or Y-direction, one or more of a plurality of first spring elements, each with a first spring hardness, and upon repositioning in the Z-direction at least a second spring element, with a second, different spring hardness, are elastically deformed by the component.

One such toolholder is already known from U.S. Pat. No. 4,639,184, with two parts that are both pivotable and axially displaceable counter to one another; one part is connected to a tool, and the other part is connected to a robot arm. The parts are prestressed into a neutral position by means of four springs; three compression springs are arranged in outer bores of the one part that are distributed approximately uniformly on the circumference. A further compression spring is also provided in a central bore of the other part and is also braced on the upper part. Upon a displacement in the X- or Y-direction, some of the outer springs distributed on the circumference and the central spring are stressed. Upon a displacement in the Z-direction, all the springs are stressed jointly in the same way. The prestressing force of the central spring can be varied by means of a set screw, and the central spring and the outer springs distributed over the circumference may optionally have different spring hardnesses.

A further toolholder is known for instance from European Patent Disclosure EP 0 249 774 A1; it is embodied as a collision guard, with two components joined elastically together which upon a collision trip an interruption in the machine motion or the motion of the handling device by way of a change in position. To reduce the weight and structural length of the collision guard and to attain high accuracy of repetition when the torch position is adjusted, the components are embodied as a conical seat acted upon by force. Between the two components, three spiral compression springs are arranged at an angular spacing of 120°; they prestress the components against one another, and in the event of a collision of the tool with some object, they allow displaceability of both components and, after the obstacle is eliminated, they restore the two components to the outset or neutral position.

In general, these robot mounts are mounted on an industrial robot between the robot and the tool, as a collision guard for the tool and the robot. The toolholders have the task, in the event of a collision, of balancing the tool and the robot and of actuating a switch to report the problem or collision and then, after elimination of the problem, restoring the tool to its predetermined outset point prior to the collision.

For this restoration, the following systems are known from the prior art. The toolholders are intended to detect the collision in all three coordinate directions X, Y and Z. When major load-bearing forces are employed, the restoring systems must accordingly be reinforced, leading to disproportionate Z components. The pneumatic versions additionally have the disadvantage that supplying compressed air via the handling device is necessary, which particularly with tools in the field of welding is unwanted.

By comparison, it is the object of the invention to embody a toolholder with the characteristics recited at the outset for withstanding major load-bearing forces without requiring the use of an additional compressed air supply, while avoiding the use of restoring systems with disproportionately high Z components and enabling a breakdown of the operative forces in the direction of the Z component as well as the X and Y components.

In the toolholder having the characteristics recited at the outset, this object is attained according to the invention in that the first spring elements and the at least one second spring element are arranged in series, or in two stages one after the other. This two-stage nature is achieved by way of the constructive distribution of force of the spring-elastic first and second elements. As a result, it is possible for impacts in the Z-direction to be absorbed first by the second spring-elastic element, and impacts in the X- and/or Y-direction first to be absorbed by some of the first spring-elastic elements. In the event of major collision forces, impacts in the Z-direction are then absorbed by the sum of all the first spring-elastic elements, while in the event of major forces acting in the X- and/or Y-direction, these forces are then absorbed by the second spring element. In the first stage, forces acting in the X- and/or Y-direction are thus absorbed by some of the first spring-elastic elements, while in the second stage, the forces acting in the Z-direction are intercepted by the second spring-elastic element.

As a result of these provisions, a breakdown of the operative forces in the direction of the Z component as well as the X and Y components is possible, so that leveling of the release forces occurs, and when major force is exerted, an interplay among the restoring components of the spring elements leads to major force absorption. The term spring elements should be understood in the context of the present application to be machine elements of the kind that upon being loaded deform elastically and that are preferably embodied as tension or compression springs, in the form of helical or spiral springs. The term spring hardness should be understood to mean the slope of the characteristic curve for spring force and spring travel of the spring element upon a defined change in shape. If the characteristic curve is linear, the spring hardness is identical to the spring constant, which is the quotient of the spring load and the associated change in shape.

In a first advantageous feature of the invention, the spring hardness of the sum of the first spring elements is greater than the spring hardness of the at least one second spring element. With this provision, care is thus taken to assure that upon a collision or an exertion of force solely in the Z-direction, the first spring element is first compressed until it has reached approximately solid length, whereupon the first spring elements can then also be compressed down to the maximally compressed solid length. It should be noted that instead of a single second spring element, a plurality of second spring elements can also be employed. In that case, for dimensioning the spring hardnesses, the spring hardness of the sum of the second spring elements, and not only the spring hardness of the single second spring element, should be employed.

It also proves to be advantageous that the spring hardness of a single first spring element is less than the spring hardness of the at least one second spring element, or the sum of the spring hardnesses of the plurality of second spring elements. With this provision, upon an impact or a collision in the X- and/or Y-direction, only some of the first spring elements are compressed or stressed until they have reached solid length. Upon very major collision forces acting in the X- and/or Y-direction, the second spring element is then compressed as well.

In particular, it has proved advantageous to design the arrangement and embodiment of the first spring elements in such a way that in the event of collision forces acting in the X- and/or Y-direction, a first spring-elastic element up to approximately one-third the total number of first spring-elastic elements can be compressed.

Moreover, it has proved advantageous that the component is embodied as a release flange that is flat, platelike or annular, and the second mount is embodied as a housing that in particular is cup-shaped and that receives the release flange and the spring elements, and in a preferred feature the housing is preferably closable with a screw-on cap. Because of this provision, the toolholder can be designed as extremely compact, and it has a comparably low weight.

In another advantageous refinement of the invention, in the neutral position, or unstressed outset position, under the influence of the spring prestressing, the release flange rests, in particular in an outer ring region, on a plurality of fixation elements, such as balls, rollers or the like, that are arranged annularly and in particular circular-annularly in the housing. Because of this provision, upon pivoting or tilting of the release flange when collision forces in the X- and/or Y-direction are exerted, is possible, specifically around the fixation elements located in the direction of impact. These fixation elements are preferably distributed over a pitch circle of the release flange, so that it is approximately assured that the release flange can be displaced, pivoted or tilted approximately in the direction of impact.

In an advantageous refinement of the invention, the release flange, in particular in an outer ring region, has countersunk features, which correspond with the position of the fixation elements and partly receive them, and the fixation elements are preferably retained by means of a retention device, such as a ball cage or the like. Because of these provisions, on the one hand care is taken to assure that upon a restoration of the release flange after the elimination of the collision or the obstacle in the collision, exact positioning of the release flange in the neutral position is assured, in which the fixation elements plunge into the associated indentations of the release flange. On the other hand, by means of the mount or the ball cage, the fixation elements are securely held in their position relative to the cap or housing by means of the mount, so that after restoration, the release flange can securely find its outset position again. The ball cage also has the task, as a pivot point, of bracing the retention device after the tilting.

In a constructive advantageous feature, the release flange is acted upon with spring prestressing by a plurality of first spring elements, in particular from four to twelve of them and preferably nine of them, that form a spring assembly. In this case, the spring hardness of the second elastic element can amount to approximately three to four times that of a single spring element of the first spring elements. Upon an impact in the X- and/or Y-direction, the only approximately one to three first spring elements, depending on the individual impact direction, are compressed, so that in this case the second spring element is initially not compressed. Upon an impact in the Z-direction, the spring hardness of the sum of first spring elements, preferably approximately six to nine, is greater than the spring hardness of the second spring element, so that in that case the second spring element is first compressed.

In another advantageous feature of the invention, the first spring elements are fastened between the component or release flange and a spring piston, which is displaceable or movable in the Z-direction and in particular is platelike, and which in turn is acted upon on its underside by the spring prestressing of the at least one second spring element. Because of this constructive provision, the two-stage nature of the force distribution of the first and second spring elements is attained, in which upon impacts in the X- and/or Y-direction because of the tilting or pivoting motion of the release flange, first the first spring elements engaging the outer ring region, or some of them, are stressed. Upon impacts in the Z-direction, all the first spring elements are stressed and act as a quasi-rigid coupling between the release flange and the spring piston, because of the overall greater spring hardness, so that then it is first the second spring element that is compressed.

Preferably, the spring piston has a central peg, in particular a hollow peg, which is guided movably or displaceably in the Z-direction in a bore of the housing. Because of this provision, assurance is provided of secure, exact movability of the spring piston inside the housing in the Z-direction.

In another advantageous feature of the invention, a perforated plate is arranged between the component or release flange and the spring piston, and one of the first spring elements is received with slight play in each of the perforations of the perforated plate, and as a result assurance is provided of a three-dimensionally fixed positioning of the first spring elements inside the housing.

In another advantageous refinement of the invention, the perforated plate has a central peg or piston, which is guided displaceably in the Z-direction in the housing, in particular in the hollow peg. In this last case, the spring piston has a central aperture to the hollow peg, in which the peg of the perforated plate is guided displaceably in the Z-direction.

A compression spring is fastened between the top side of the spring piston and the underside of the perforated plate and serves to return the perforated plate to the neutral or outset position after release, in the event of a collision and elimination of the obstacle in the collision.

It has furthermore proved advantageous that a lug, switch element, or the like, with which a switch on the housing is associated, is arranged on the component, on the perforated plate, or on the spring piston. Since the introduction of force in a collision impact is transmitted in each case to the perforated plate as well via the release flange, regardless of whether one or more of the first spring elements, or the second spring element, is compressed, it proves advantageous to arrange the lug particularly on the perforated plate, so that if a predetermined displacement or repositioning of the perforated plate is exceeded, a switch device can be actuated by means of the lug, and an emergency shutoff for the handling device or the tool can be performed.

With regard to the dimensioning of the spring hardness of the second spring element, it has proved advantageous that in a special embodiment, that this spring hardness is equivalent to approximately three to four times the spring hardness of a single first spring element. This dimensioning is based on the thought that upon an impact in the X- and/or Y-direction, only one or some of the first spring elements are compressed via the release flange. If approximately eight to nine first spring elements are used, then the present dimensioning has proved advantageous. If more or fewer spring elements are combined into a spring assembly, the dimensioning of the spring hardness of the second spring element can change accordingly.

For engineering reasons, it has also proved advantageous that the first spring elements each have essentially approximately the same spring hardness, so that the first spring elements can be preferably embodied essentially identically to one another.

Finally, the spring elements can preferably be embodied as compression springs or helical springs.

Further characteristics, advantages, possible applications and features of the present invention will become apparent from the ensuing description of an exemplary embodiment. All the characteristics described and/or shown in the drawing form the subject of the present invention either on their own or in arbitrary combination, including independently of how they are summarized in the claims or the dependency of the claims.

Figure 4:
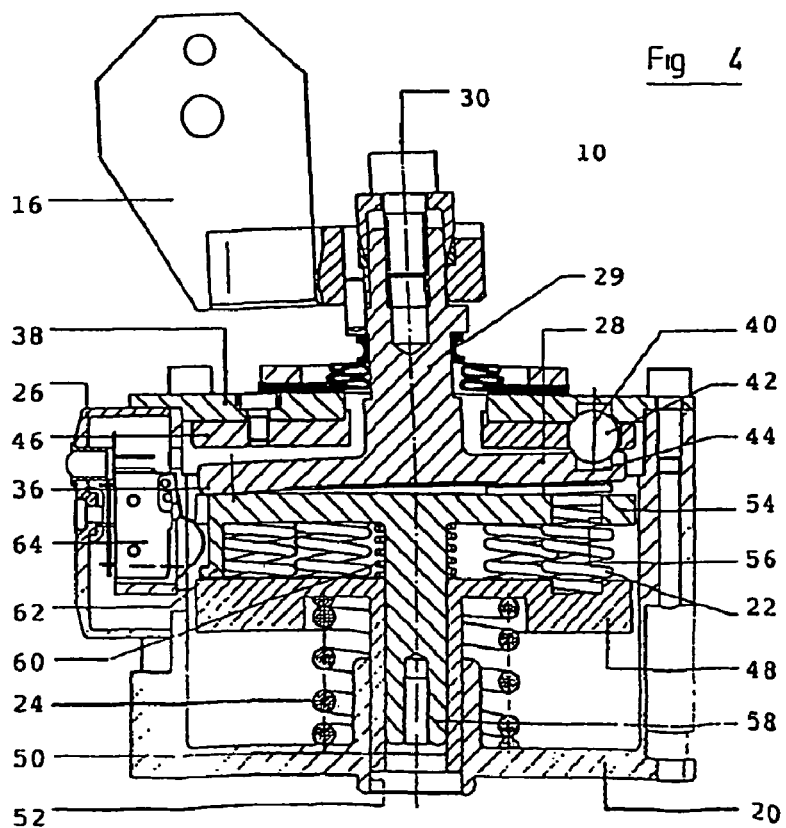
Figure 2:
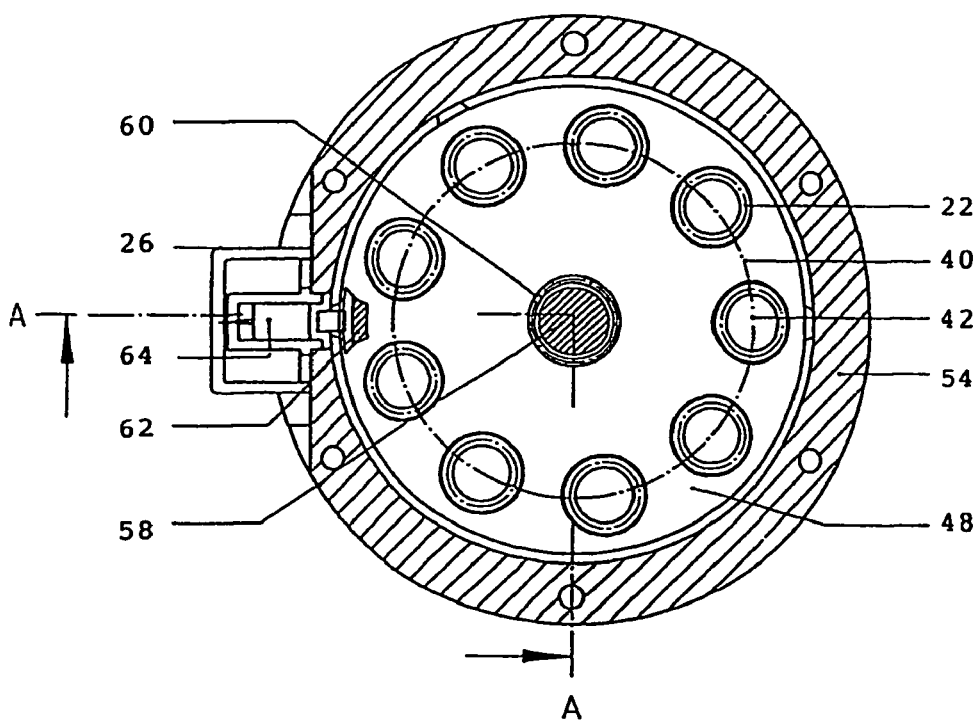
Figure 3:
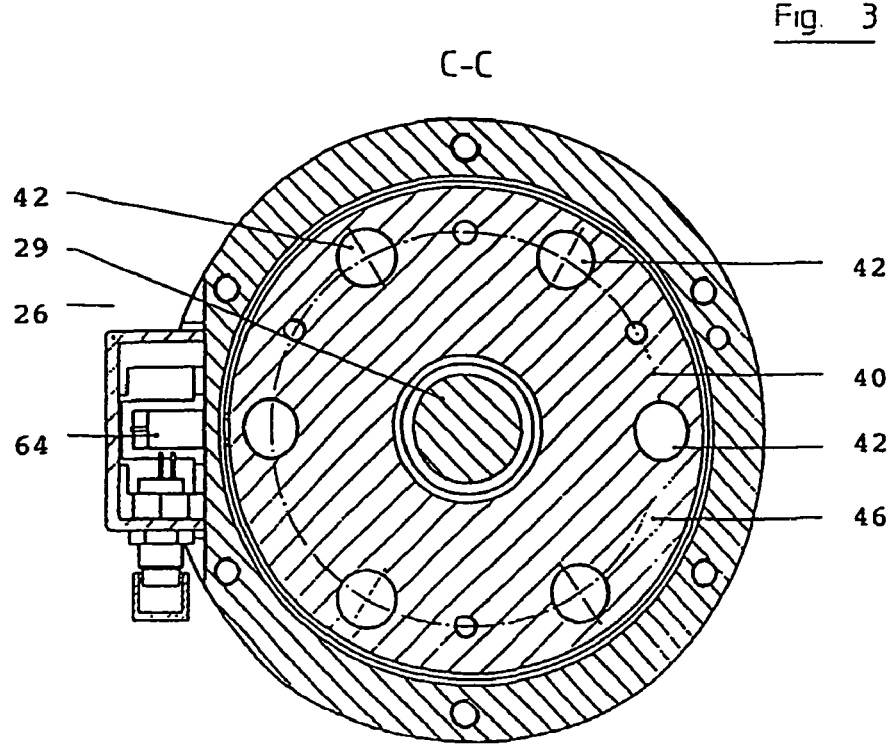
Figure 5:
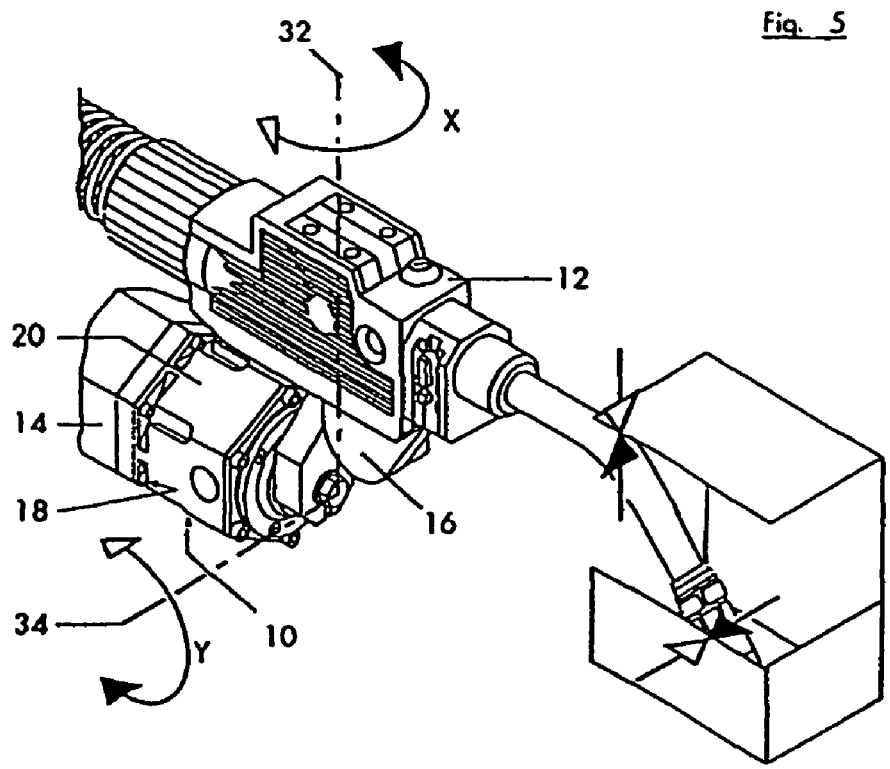
Figure 6:
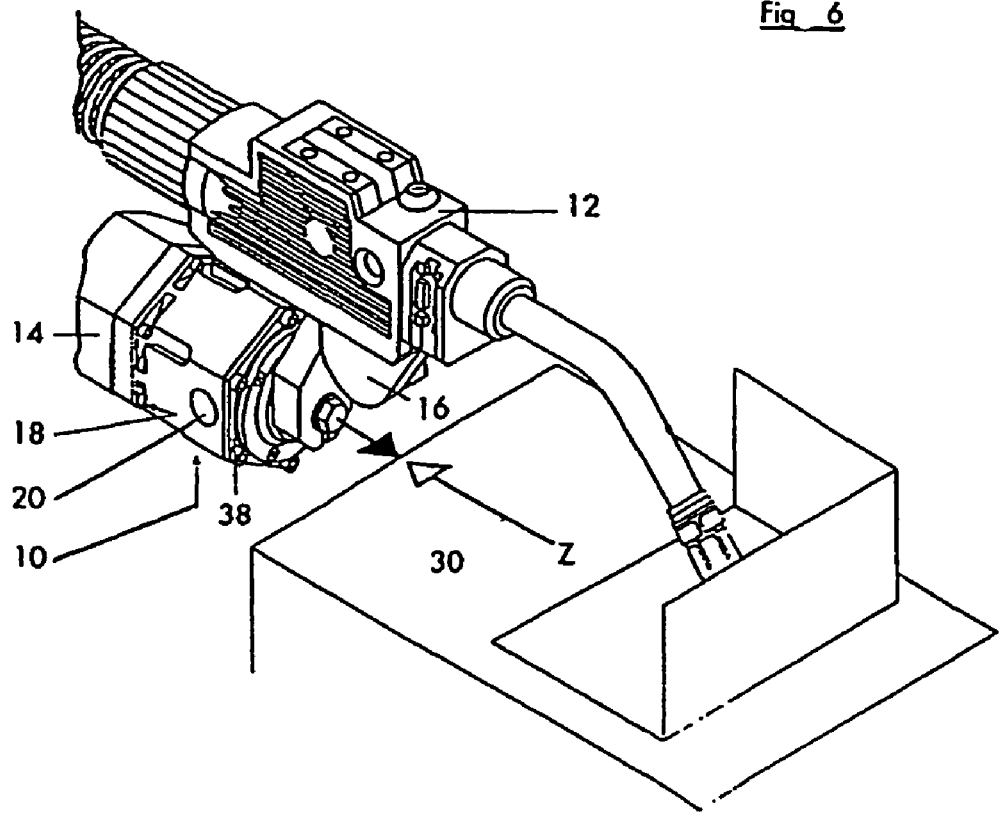

Shown are:

FIG. 1, a sectional view through one exemplary embodiment of the toolholder of the invention, taken along the line A—A in FIG. 2, in which the release flange is in the neutral position, without collision stressing;

FIG. 2, the toolholder of FIG. 1 taken along the line B—B;

FIG. 3, the toolholder of FIG. 1 taken along the line C—C;

FIG. 4, the toolholder of FIG. 1 during a collision incident, in which the release flange is tilted or pivoted out of the neutral position; and FIGS. 5 and 6, a toolholder of the invention in combination with a tool and an only partly shown handling device, for illustrating the various collision incidents and the collision forces occurring in them.

In the drawings, a toolholder 10 for coupling a tool 12, in particular a welding torch or cutting torch, to a handling device 14, in particular an industrial robot, is shown, having a first mount 16 for fixing the tool 12 to the toolholder 10 and a second mount 18, for instance a housing 20, for fixing the toolholder 10 to the handling device 14. The first and second mounts 16, 18 can be displaced or repositioned relative to one another counter to a spring prestressing of spring elements 22, 24.

A protective circuit 26 is also provided for deactivating the handling device 14 and/or the tool 12 if predetermined displacements or repositionings are exceeded. Connected to the first mount 16, for instance via a peg 29, is a component 28 which is displaceable or movable in the Z-direction 30, which coincides with a toolholder longitudinal axis, and is displaceable, for instance pivotable or tiltable, relative to the second mount 18 in the X- and/or Y-direction 32, 34. Upon a displacement of the component 28 in the X- and/or Y-direction 32, 34, one or some of a plurality of first spring elements 22, each with a first spring hardness, and upon repositioning of the component 28 in the Z-direction 30 at least one second spring element 24 having a second, different spring hardness is compressed. The spring hardnesses of the sum of the first spring elements 22 is greater than the spring hardness of the at least one second spring element 24, or if a plurality of second spring elements 24 are used, it is greater than the sum of the spring hardnesses of the second spring elements 24. Moreover, the spring hardness of a single first spring element 22 is less than the spring hardness of the at least one second spring element 24. The first spring elements 22 and the at least one second spring element 24 are arranged in series in such a way that they can be released in two stages. The component 28, in the preferred embodiment, is embodied as a release flange 36 that in particular is flat, platelike or annular. The second mount 18 is embodied as a preferably cup-shaped housing 20, which receives both the release flange 36 and the spring elements 22, 24. The housing 20 can be closed with a screw-on cap 38, which has an opening through which a peg 29 protrudes that connects the release flange 36 with the first mount. The peg 29 is preferably surrounded by a sealing cuff, which is detachably secured to the cap 38.

The release flange 36, in a neutral position or in other words without the exertion of collision forces, is pressed under the influence of the spring prestressing in an outer ring region 40 against a plurality of annular or circular-annular fixation elements 42, which are embodied for instance as balls. The arrangement of the fixation elements 42 can be seen in particular from FIG. 3. In an outer ring region 40 on the top, the release flange 36 also has countersunk features 44, which correspond with the positioning of the fixation elements 42 and partly receive them. The fixation elements 42 are also retained in the cap 38 by means of a retention device, such as a ball cage 46. Comparable countersunk features can also be provided in the underside of the cap 38, and once again the fixation elements 42 are partly received in them.

In an outer ring region 40 on the underside, the release flange 36 is acted upon with spring prestressing by a plurality of first spring elements 22, in this exemplary embodiment nine of them; these first spring elements 22 form a spring assembly. The first spring elements 22 making up the spring assembly are fastened between the component 28 or release flange 36 and a spring piston 48, in particular platelike, which is displaceable or movable in the Z-direction and which in turn is acted upon on the underside by the spring prestressing of the at least one second spring element 24. The spring piston 48 has a central peg, preferably embodied as a hollow peg 50, which is guided displaceably in a bore 52 of the housing 20 in the Z-direction 30. Between the component 28 or release flange 36 and the spring piston 48, a perforated plate 54 is provided, which can essentially be circular in shape and in whose perforations 56 the first spring elements are received with slight play. The perforated plate 54 has a peg or piston 58, which is guided displaceably in the Z-direction 30 in the housing 20, in particular in the hollow peg 50. Between the top side of the spring piston 48 and the underside of the perforated plate 54, a compression spring 60 is fastened. A lug 62, switch element or the like, is arranged on the perforated plate 54, and a switch 64 on the housing is associated with it.

The spring hardness of the second spring element 24 preferably has approximately three to four times the value of the spring hardness of a single spring element 22. The first spring elements 22 each have essentially the same spring hardness. The spring elements 22, 24 are preferably embodied as compression springs or helical springs.

In operation of the toolholder 10, a collision incident can occur, as indicated in FIGS. 5 and 6, in which the tool 12 in FIG. 5 can be acted upon in the X- and/or Y-direction by collision forces, or in FIG. 6 in the Z-direction by collision forces. If the toolholder 10 is acted upon solely by collision forces acting in the Z-direction 30, then the component 28 or release flange 36 also moves solely in the Z-direction; a tilting or pivoting motion of the kind shown in FIG. 4 does not occur. Since the spring hardness of the sum of the first spring elements 22 is greater than the spring hardness of the at least one second spring element 24, at first essentially only the second spring element 24 is compressed; the release flange 36, perforated plate 54 and spring piston 48 can be moved jointly in the Z-direction 30 downward in the direction of the bottom of the housing 20.

After a preselectable travel distance, the protective circuit 26 is activated; the lug 22 activates or releases a switch lever of a switch 64. After actuation of the switch 64, the handling device 14 and/or the tool 12 is switched off.

If very high collision forces are exerted in the Z-direction, then first the second spring element 24 is compressed approximately to solid length, and after that the first spring elements 22 of the spring assembly are likewise compressed, until they too have reached their solid length.

In summary, extremely high collision forces can be compensated for by the provisions according to the invention.

After the elimination of the obstacle in the collision, the spring piston 48, because of the action of the second spring element 24, and the release flange 36, because of the spring prestressing of the sum of first spring elements 22, are returned to the neutral position shown in FIG. 1. The perforated plate 54 is restored to the tightened position in FIG. 1 under the influence of the compression spring 60. Because of the countersunk features 44 provided in the release flange 36, the neutral position of the release flange 36 is established exactly and replicably. The ball cage 46 has the task of keeping the fixation elements 42 or balls in their position relative to the cap 38, so that an exact and replicable restoration of the release flange 36 is attained. The ball cage 46 also serves as a brace for the release flange 36 upon tilting or pivoting thereof.

If collision forces are exerted not only in the Z-direction but also in the X- and/or Y-direction 32, 34, then the release flange 36 for instance tilts into the position shown in FIG. 4, in which one or a few of the fixation elements 42, or the ball cage 46, serves as a tilting or pivot bearing. Upon a tilting or pivoting motion of the release flange 36, only one or a few of the first spring elements 22 are compressed, and if for instance nine first spring elements 22 are used, then approximately one to three first spring elements 22 can be compressed. Since the spring hardness of the second spring element 24 is equivalent to approximately three to four times the spring hardness of a single first spring element 22, upon a collision in the X- and/or Y-direction 32, 34, first the one or a few of the first spring elements 22 are compressed, and the perforated plate 54, because of its displaceable guidance solely in the Z-direction 30 is in turn repositioned in the direction of the bottom of the housing 20. Only if the tilting motion of the release flange 36 is so pronounced that more than three or approximately four first spring elements 22 are compressed is the second spring element 24 also subjected to compression, and the perforated plate 54 in every case is moved by the sum of the spring travel of both spring elements 22, 24.

In this case as well, if a predetermined tilting value or movement distance of the perforated plate 54 is exceeded, the switch 64 is actuated by means of the lug 62, so that the handling device 14 and/or tool 12 can be switched off. After the obstacle or reason for the collision has been eliminated, the release flange 36 pivots back from the tightened position, shown in FIG. 4, into the neutral position of FIG. 1, which is defined unambiguously and accurately on the basis of the fixation elements 42.

It is understood that a plurality of protective circuits 26 with a switch 64 and the associated lug 62 can also be associated with the toolholder 10.

The two-stage nature according to the invention of the spring system employed is attained by way of the constructive distribution of force between first spring elements 22 and the at least one second spring element 24. As a result, it becomes possible for impacts acting in the Z-direction 30 to be absorbed by the second spring element 24 and those acting in the X- and/or Y-direction 32, 34 to be absorbed by one or a few first spring elements 22. The first upper stage comprising the first spring elements 22 accordingly serves to absorb forces acting in the X- and/or Y-direction 32, 34, and the lower stage, comprising the at least one second spring element 24, serves to absorb forces acting in the Z-direction 30.

LIST OF REFERENCE NUMERALS

10 Toolholder
12 Tool
14 Handling device
16 First mount
18 Second mount
20 Housing
22 First spring element
24 Second spring element
26 Protective circuit
28 Component
29 Peg
30 Z-direction
32 X-direction
34 Y-direction
36 Release flange
38 Cap
40 Outer ring region
42 Fixation element
44 Countersunk feature
46 Ball cage
48 Spring piston
50 Hollow peg
52 Bore
54 Perforated plate
56 Perforation
58 Piston
60 Compression spring
62 Lug
64 Switch

What is claimed is:

1. A toolholder (10) for coupling a tool (12), in particular a welding torch or cutting torch, to a handling device (14), in particular an industrial robot, having a first mount (16) for fixing the tool (12) to the toolholder (10) and having a second mount (18), such as a housing, for fixing the toolholder (10) to the handling device (14), wherein the first and second mounts (16, 18) can be displaced or repositioned relative to one another counter to a spring prestressing of spring elements (22, 24), and having a protective circuit (26) for deactivating the handling device (14) and/or the tool (12) if predetermined displacements or repositionings are exceeded, wherein a component (28) connected to the first mount (16) can be repositioned or driven in the Z-direction (30) which is the toolholder longitudinal axis and can be displaced in the X- and/or Y-direction (32, 34), for instance being pivotable or tiltable, relative to the second mount (18), and upon displacement in the X- and/or Y-direction (32, 34), only a single one or some of a plurality of first spring elements (22), with a first spring hardness, and upon repositioning in the Z-direction (30) at least a second spring element (24), with a second, different spring hardness, are stressed, and the first spring element or first spring elements (22) and the at least one second spring element (24) are arranged in series, or in two stages one after the other, characterized in that the spring hardness of a single first spring element (22) is less than the spring hardness of the at least one second spring element (24).

2. The toolholder of claim 1, characterized in that the spring hardness of the sum of the first spring elements (22) is greater than the spring hardness of the at least one second spring element (24).

3. The toolholder of claim 1, characterized in that the plurality of first spring elements (22) each have the first spring hardness.

4. The toolholder of claim 1, characterized in that the component (28) is embodied as a release flange (36) that in particular is flat, platelike or annular, and the second mount (18) is embodied as a preferably cup-shaped housing (20) that receives the release flange (36) and the spring elements (22, 24), and the housing (20) is preferably closable with a screw-on cap (38).

5. The toolholder of claim 4, characterized in that in the neutral position, under the influence of the spring prestressing, the release flange (36) rests, in particular in an outer ring region (40), on a plurality of fixation elements (42), such as balls, that are arranged annularly and in particular circular-annularly in the housing (20).

6. The toolholder of claim 5, characterized in that the release flange (36), in particular in an outer ring region (40), has countersunk features (44), which correspond with the position of the fixation elements (42) and partly receive them, and the fixation elements (42) are preferably retained by means of a retention device, such as a ball cage (46).

7. The toolholder of claim 1, characterized in that the release flange (36) is acted upon with spring prestressing by a plurality of first spring elements (22), in particular from four to twelve of them and preferably nine of them, that form a spring assembly.

8. The toolholder of claim 1, characterized in that the first spring elements (22) are fastened between the component (28) and a spring piston (48), which is displaceable or movable in the Z-direction (30) and in particular is platelike, and which in turn is acted upon on its underside by the spring prestressing of the at least one second spring element (24).

9. The toolholder of claim 8, characterized in that the spring piston (48) has a central hollow peg (50), which is guided displaceably in the Z-direction (30) in a bore (52) of the housing (20).

10. The toolholder of claim 1, characterized in that a perforated plate (54) is arranged between the component (28) and the spring piston (48), and the first spring elements (22) are received with slight play in the perforations (56) of the perforated plate.

11. The toolholder of claim 10, characterized in that the perforated plate (54) has a central peg or piston (58), which is guided displaceably in the Z-direction (30) in the housing (20), in particular in the hollow peg (50).

12. The toolholder of claim 10, characterized in that a compression spring is fastened between the top side of the spring piston (48) and the underside of the perforated plate (54).

13. The toolholder of claim 1, characterized in that a lug (62), switch element, or the like, with which a switch (64) is associated, is arranged on the component (28) or on the spring piston (48), and preferably on the perforated plate (54).

14. The toolholder of claim 1, characterized in that the spring hardness of the second spring element (24) is equivalent to approximately three to four times the spring hardness of a single first spring element (22) of the preferably nine first spring elements (22).

15. The toolholder of claim 1, characterized in that the first spring elements (22) each have essentially the same spring hardness.

16. The toolholder of claim 1, characterized in that the spring elements (22, 24) are embodied as compression springs or helical springs.

* * * * *